3,030,221
ROSIN SIZE STABILIZED AGAINST CRYSTALLIZATION AND METHOD OF MAKING
Spencer H. Watkins, Wilmington, Del., assignor to Hercules Powder Company, Wilmington, Del., a corporation of Delaware
No Drawing. Filed Nov. 19, 1957, Ser. No. 697,317
12 Claims. (Cl. 106—238)

This invention relates to paste rosin sizes stabilized against crystallization and to methods of preparing the same.

It is well known that paste rosin sizes of constant total solids content and dilute emulsions prepared therefrom show, with increasing free rosin content, increasing tendency toward crystallization in storage. Also, sizes at constant acid number show, with increasing solids content, increasing tendency toward crystallization in storage. Thus, in the preparation of paper sizes from rosin, total solids and acid number must be controlled, i.e., not permitted to exceed certain maximum values depending on the type of rosin, in order to avoid crystallization. However, by so doing one encounters another problem, namely, gelation of the size. The gelation problem can be avoided only by raising the solids content and acid number, but this, unfortunately, sets the stage for crystallization.

It has now been discovered that crystallization is strikingly inhibited in paste rosin sizes by the inclusion therein of stabilizing amounts of amides containing as a moiety at least one resin acid nucleus and having molecular weights of at least about 370. Amides which are particularly suitable for use herein are characterized by having a structure derived from (1) rosin amine and an organic acid of more than four carbons, (2) rosin amine and a di- or poly-basic organic acid, (3) rosin acid and an amine containing five or more carbons, and (4) rosin acid and a di- or poly-functional amine. These amides may be prepared by any of the usual amide formation procedures such as the condensation of an acid anhydride, acid chloride, etc. with an amine.

The following formulas are representative of the compounds suitable for use herein:

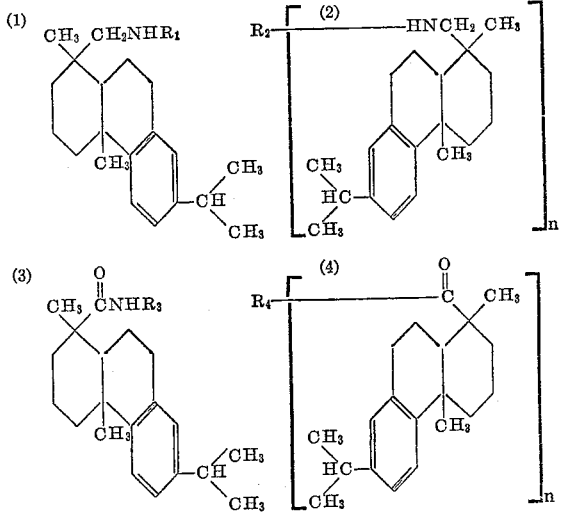

where $R_1$ is the residue of an organic acid, such as carboxylic, sulfonic and phosphonic acids containing at least five carbon atoms, $R_2$ is an organic radical derived from a di- or poly-basic organic acid, $R_3$ is the residue of an aliphatic or aromatic amine preferably having at least five carbon atoms, $R_4$ is the organic residue of a di- or poly-amine and $n$ is 2 or more. These compounds may be prepared by condensing a suitable amine and an organic acid, acid halide, anhydride, etc. or by any other of the usual amidation procedures.

By stabilizing amount is meant an amount sufficient to prevent excessive crystallization in the paste rosin size during its storage under ordinary commercial conditions. Ordinarily, I find that from about 10% to about 20% of the rosin amide, based on the weight of the rosin, is sufficient to prevent crystallization. My preferred range is from about 12% to about 16%.

The following examples are presented in illustration but not in limitation of the invention. All parts and percentages are by weight unless otherwise specified.

EXAMPLES 1–11

Paste sizes were prepared from tall oil rosin and wood rosin containing 15% by weight, based on the weight of rosin, of various high molecular weight rosin amides within the scope of the invention. The tall oil rosin utilized in preparing the sizes of Examples 1, 2, 9, 10 and 11 had the following characteristics: Acid number 172, ring and ball softening point 82.5° C., percent resin acids 88.6, percent fatty acids 4.0.

The wood rosin used in preparing the sizes of Examples 3–8 had an acid number of 179.5 and a ring and ball softening point of 87° C.

The sizes were cooked in the usual manner by melting the rosin, adding sufficient water and caustic to give the desired total solids and free rosin and stirring until a smooth paste was obtained. Samples of each size were seeded with rosin size crystals and stored in an oven, in a closed container, at 60° C. The rate of crystallization was determined by examining the samples microscopically at weekly intervals. The results of these tests are shown in the following table:

Table

| Example No. | Crystal Inhibitor | Percent Free Rosin | Crystallization (70% Total Solids) |
|---|---|---|---|
| 1 | None | 11 | Crystallized in 20 days. |
| 2 | do | 15 | Crystallized in 8 days. |
| 3 | do | 22 | Crystallized in <4 days. |
| 4 | N-Propyl abietamide | 21 | Crystallized in 9 days. |
| 5 | N-Hexyl abietamide | 22 | No crystal growth in 46 days. |
| 6 | Benzyl abietamide | 22 | Very slight growth in 28 days. |
| 7 | Diabetyl succinamide | 20 | No crystal growth in 42 days. |
| | N-dihydroabietyl dehydroabietamide | 20 | Do. |
| 9 | N-abietyl Dymerex amide | 20 | No crystal growth in 45 days. |
| 10 | N-abietyl benzamide | 22 | Very slight growth in 45 days. |
| 11 | Diabetyl benzenephosphonamide | 24 | No crystal growth in 45 days. |

Examples 1, 2 and 3 show that the higher the percent free rosin in the size, the more rapidly the size tends to crystallize. Examples 4 and 5 show that the substituent group must have a chain length of more than three carbon atoms to be effective. A carbon chain length of at least 5 carbons is preferred. Examples 6 through 11 show the high level of effectiveness of the high molecular weight rosin amides.

In the preparation of the rosin size compositions in accordance with the invention, the rosin amide is preferably added to the rosin and the blended rosin then converted into size in the usual manner as by heating with an alkali such as sodium carbonate, sodium hydroxide and so on. Alternatively, the rosin amide may be added during the preparation of the size.

The process of the invention is applicable to the stabilization of rosin size compositions prepared from any of the rosin materials conventionally used in the preparation of rosin sizes including gum rosin, wood rosin, tall oil rosin, specially refined and/or treated rosins, and so on. The process of the invention is also applicable to the stabilization of rosin size compositions containing adducts of rosin and materials such as maleic acid, maleic anhydride, furamic acid, itaconic acid, citraconic acid and the like, and known in the art as fortified rosin sizes. As before, the rosin amide may be added at any desired point before or during size formation and before or after formation of the adduct.

It will thus be seen that the invention provides rosin sizes stabilized against crystallization and methods of preparing same. While preferred embodiments of the invention have been described herein, the invention is not to be construed as limited thereby except as indicated in the following claims.

What I claim and desire to protect by Letters Patent is:

1. A method of preparing paste rosin sizes stabilized against crystallization which comprises incorporating with rosin from about 10% to about 20% by weight, based on the weight of rosin, of a compound selected from the group consisting of N-abietyl monomide of abietic acid dimer, N-abietyl benzamide, diabietyl benzenephosphonamide, n-hexyl abietamide and benzyl abietamide, and then converting the thus-treated rosin to size by treatment with alkali.

2. A method of preparing paste rosin sizes stabilized against crystallization which comprises incorporating with rosin from about 10% to about 20% by weight, based on the weight of rosin, of N-abietyl monamide of abietic acid dimer, and then converting the thus-treated rosin to size by treatment with alkali.

3. A method of preparing paste rosin sizes stabilized against crystallization which comprises incorporating with rosin from about 10% to about 20% by weight, based on the weight of rosin, of N-abietyl benzamide, and then converting the thus-treated rosin to size by treatment with alkali.

4. A method of preparing paste rosin sizes stabilized against crystallization which comprises incorporating with rosin from about 10% to about 20% by weight, based on the weight of rosin, of diabietyl benzenephosphonamide, and then converting the thus-treated rosin to size by treatment with alkali.

5. A method of preparing paste rosin sizes stabilized against crystallization which comprises incorporating with rosin from about 10% to about 20% by weight, based on the weight of rosin, of n-hexyl abietamide, and then converting the thus-treated rosin to size by treatment with alkali.

6. A method of preparing paste rosin sizes stabilized against crystallization which comprises incorporating with rosin from about 10% to about 20% by weight, based on the weight of rosin, of benzyl abietamide, and then converting the thus-treated rosin to size by treatment with alkali.

7. A paste rosin size composition stabilized against crystallization by the incorporation therein of from about 10% to about 20% by weight, based on the weight of rosin, of a compound selected from the group consisting of N-abietyl monamide of abietic acid dimer, N-abietyl benzamide, diabietyl benzenephosphonamide, n-hexyl abietamide and benzyl abietamide.

8. A paste rosin size composition stabilized against crystallization by the incorporation therein of from about 10% to about 20% by weight, based on the weight of rosin, of N-abietyl monamide of abietic acid dimer.

9. A paste rosin size composition stabilized against crystallization by the incorporation therein of from about 10% to about 20% by weight, based on the weight of rosin, of N-abietyl benzamide.

10. A paste rosin size composition stabilized against crystallization by the incorporation therein of from about 10% to about 20% by weight, based on the weight of rosin, of diabietyl benzenephosphonamide.

11. A paste rosin size composition stabilized against crystallization by the incorporation therein of from about 10% to about 20% by weight, based on the weight of rosin, of n-hexyl abietamide.

12. A paste rosin size composition stabilized against crystallization by the incorporation therein of from about 10% to about 20% by weight, based on the weight of rosin, of benzyl abietamide.

References Cited in the file of this patent

UNITED STATES PATENTS

| | | |
|---|---|---|
| 2,483,797 | Van Valkenburg | Oct. 4, 1949 |
| 2,694,072 | Von Glahn | Nov. 9, 1954 |
| 2,758,026 | Landes | Aug. 7, 1956 |
| 2,767,089 | Renfrew | Oct. 16, 1956 |
| 2,776,221 | Strazdins | Jan. 1, 1957 |
| 2,776,275 | Strazdins | Jan. 1, 1957 |
| 2,864,716 | Schmalz | Dec. 16, 1958 |